United States Patent [19]
Nam et al.

[11] Patent Number: 5,550,885
[45] Date of Patent: Aug. 27, 1996

[54] CONTROL DEVICE FOR POWER SAVING

[75] Inventors: Keyoung T. Nam; Hong E. Sung, both of Kyungsangbuk-Do, Rep. of Korea

[73] Assignee: LG Electronics, Inc., Rep. of Korea

[21] Appl. No.: 563,984

[22] Filed: Nov. 29, 1995

[30] Foreign Application Priority Data

Nov. 30, 1994 [KR] Rep. of Korea .................. P94-31938

[51] Int. Cl.⁶ .................................................. H03K 21/00
[52] U.S. Cl. .................. 377/27; 377/20; 327/544
[58] Field of Search .................... 377/27, 55-5-6, 377/20; 327/544

[56] References Cited

U.S. PATENT DOCUMENTS 4,994,719  2/1991  Lenardo ................................ 315/411
5,329,169  7/1994  Ihara .................................... 327/544

FOREIGN PATENT DOCUMENTS

000549165  6/1993  European Pat. Off. ............. 327/544

Primary Examiner—Margaret Rose Wambach
Attorney, Agent, or Firm—Fish & Richardson P.C.

[57] ABSTRACT

A control device for power saving for personal computers, printers, etc. which generates a suspension signal or a power-off signal to perform power saving by detecting input horizontal and vertical sync signals. The suspension signal provides a suspension mode for a minimum basic operation of the computer or printer, while the power-off signal provides a system power-off mode. The control device is designed as a digital circuit comprising latches, counters, monostable multivibrators, and other logical elements. Integration of the circuit is possible as well as its transient response characteristic is improved.

10 Claims, 5 Drawing Sheets

CONTROL DEVICE FOR POWER SAVING

BACKGROUND OF THE INVENTION

1. Field of the Invention

The present invention relates to a control device for power saving for electric and electronic appliances such as personal computers, printers, etc. which generates a suspension signal or a power-off signal to save power by detecting a horizontal sync signal and a vertical sync signal generated in the appliances.

2. Description of the Prior Art

Power saving is a function of electric or electronic appliances such as personal computers, printers, etc. which can prevent unnecessary power consumption by automatically putting the appliance in a power saving mode if the appliance is not used for a predetermined time. Power saving may be divided into a suspension mode for providing a power supply for a minimum basic operation of the appliance and a power-off mode for intercepting the power supply. In a personal computer, a processor provides to a control device for power saving a horizontal sync signal and a vertical sync signal being supplied to a monitor in a normal mode of operation if a key signal is not entered for a predetermined time. Then, the control device for power saving detects the sync signals and in combination of the sync signals, provides to a central processing unit (CPU) a suspension signal commanding the CPU to go into the suspension mode, or a power-off signal commanding the CPU to go into the power-off mode.

Figure 1:
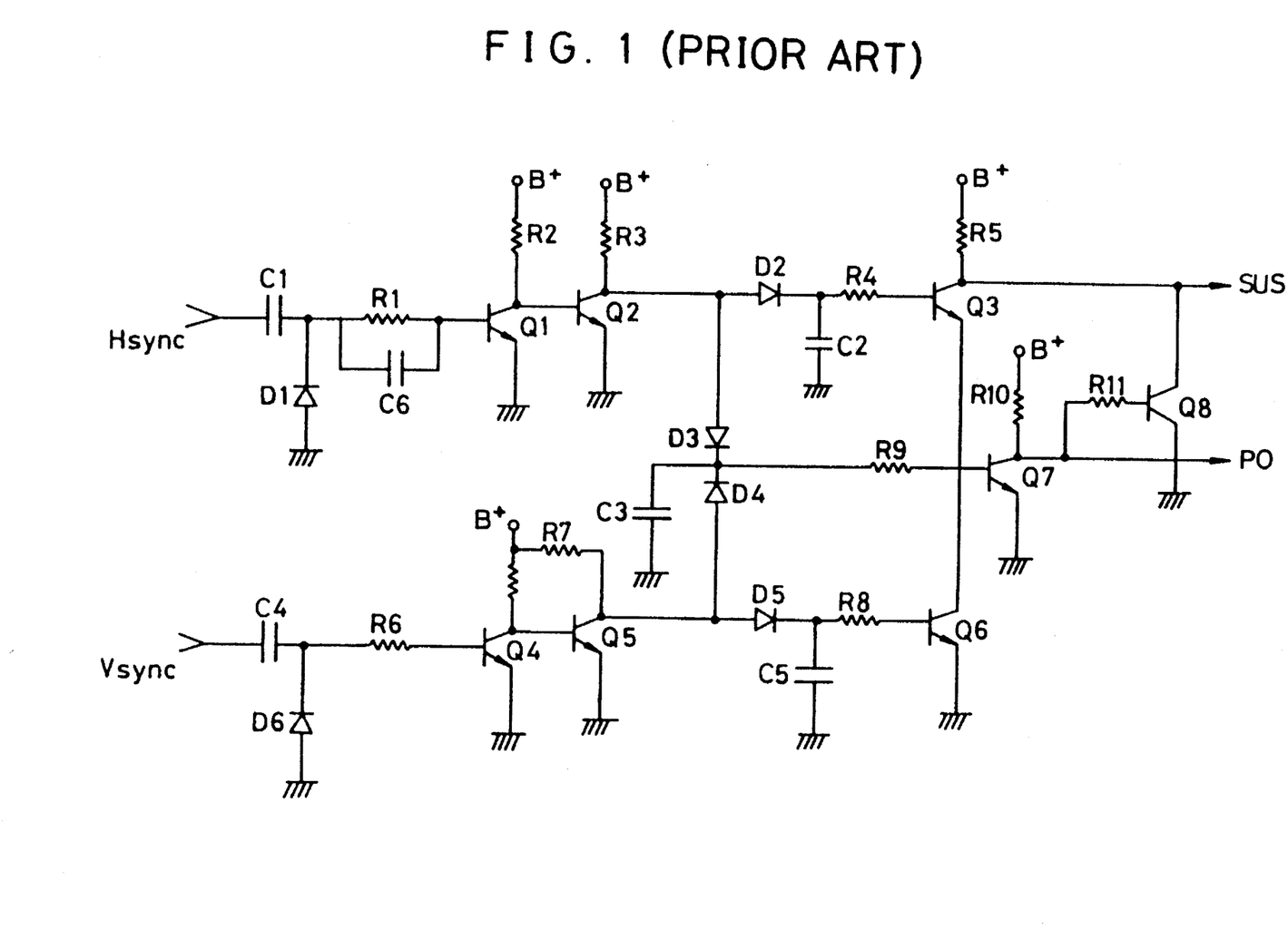
FIG. 1 is a schematic circuit diagram of a conventional control device for power saving.

FIG. 1 is a schematic circuit diagram of a conventional device for power saving. Referring to FIG. 1, the conventional device is provided with a diode D1 for clamping an input horizontal sync signal Hsync, transistors Q1 and Q2 which are reversely turned on or off by the horizontal sync signal Hsync inputted through the diode D1, a diode D6 for clamping an input vertical sync signal Vsync, transistors Q4 and Q5 which are reversely turned on or off by the vertical sync signal Vsync inputted through the diode D6, diodes D2 to D5 and capacitors C2, C3, and C5 for rectifying and smoothing outputs of the transistors Q1, Q2, Q4, and Q5, and output transistors Q3, Q6 to Q8 which are controlled to be turned on or off according to the rectified and smoothed output signals to provide a suspension signal SUS or a power-off signal PO.

The numerals C1 and C4 denote coupling capacitors, R1 to R11 denote resistors, and B+ denotes a power supply.

The operation of the conventional control device for power saving as constructed above will now be explained.

Referring again to FIG. 1, if both the horizontal sync signal Hsync and the vertical sync signal Vsync are inputted, the input horizontal sync signal Hsync is clamped through the capacitor C1 and the diode D1, and the clamped sync signal is applied to the transistors Q1 and Q2 through the speed-up capacitor C6 and the resistor R1 to operate the transistors Q1 and Q2. The output of the transistor Q12 is rectified to a direct current (DC) signal by the diodes D2 and D3 and the capacitors C2 and C3, and this DC signal is applied to the transistors Q3 and Q7. The transistor Q3 is turned on by the voltage rectified by the diode D2 and the capacitor C2, while the transistor Q7 is turned on by the voltage rectified by the diode D3 and the capacitor C3. If the transistor Q7 is turned on, the transistor Q8 is turned off.

In the meantime, the input vertical sync signal Vsync is clamped through the capacitor C4 and the diode D6, and the clamped sync signal is applied to the transistors Q4 and Q5 through the resistor R6 to operate the transistors Q4 and Q5. The output of the transistor Q5 is rectified by the diodes D4 and D5 and the capacitors C3 and C5, and the rectified DC signal is applied to the transistors Q6 and Q7. The transistor Q6 is turned on by the DC voltage rectified by the diode D5 and the capacitor C5, causing the suspension signal SUS to become low. Also, the transistor Q7 is turned on by the DC voltage rectified by the diode D4 and the capacitor C3 and the voltage rectified by the diode D3, causing the power-off signal PO to become low. In this case, the system is in the normal mode.

In case that the horizontal sync signal Hsync is inputted, but the vertical sync signal Vsync is not inputted, the transistor Q6 remains turned off, resulting in that the transistor Q3 is turned off and the transistor Q7 is turned on. Accordingly, the suspension signal SUS becomes high, while the power-off signal PO becomes low, causing the system to go into the suspension mode. On the contrary, in case that the horizontal sync signal Hsync is not inputted, but the vertical sync signal Vsync is inputted, the transistors Q4, Q5, and Q7 are all turned on, but the transistors Q3 and Q6 are turned off. Accordingly, the suspension signal SUS becomes high, while the power-off signal PO becomes low, causing the system also to go into the suspension mode.

In case that neither the horizontal sync signal Hsync nor the vertical sync signal Vsync is inputted, the transistors Q1 to Q3, and Q7 are turned off, and the transistors Q4 to Q6 are turned off due to the absence of the horizontal and vertical sync signals Hsync and Vsync. Since the transistor Q7 is turned off, the transistor Q8 is turned on, and thus the suspension signal SUS becomes low, while the power-off signal PO becomes high, causing the system to go into the power-off mode.

However, the conventional control device for power saving as shown in FIG. 1 has the disadvantage that it has an inferior transient response characteristic since it is constructed as an analog circuit. Further, the initial operation of the conventional device becomes unstable due to the capacitance of the capacitors employed in the circuit. This causes the reliability of the power saving to deteriorate and integration of the circuit to be difficult.

SUMMARY OF THE INVENTION

It is an object of the present invention to provide a control device for power saving which enables integration of the circuit and improves its transient response characteristic by constructing the device with a digital circuit.

In order to achieve the above object, the control device for power saving according to the present invention comprises:

horizontal sync signal input means for providing a horizontal sync signal synchronized with a system clock signal;

horizontal sync signal detecting means for detecting whether or not said horizontal sync signal is inputted by counting an output of said horizontal sync signal input means;

horizontal detected signal output means for outputting a horizontal power-off signal in accordance with an output of said horizontal sync signal detecting means;

vertical sync signal input means for providing a vertical sync signal synchronized with said system clock signal;

vertical sync signal detecting means for detecting whether or not said vertical sync signal is inputted by counting an output of said vertical sync signal input means;

vertical detected signal output means for outputting a vertical power-off signal in accordance with an output of said vertical sync signal detecting means;

control signal output means for outputting a system power-off signal or a suspension signal for a suspension mode in accordance with said horizontal power-off signal from said horizontal detected signal output means and said vertical power-off signal from said vertical detected signal output means; and clock generating means for providing said system clock signal to said horizontal sync signal detecting means and said vertical sync signal detecting means.

BRIEF DESCRIPTION OF THE DRAWINGS

The above object and other features and advantages of the present invention will become more apparent by describing the preferred embodiments thereof with reference to the accompanying drawings, in which:

FIGS. 3A to 3I are waveform diagrams related to the horizontal sync signal at various points in FIG. 2.

FIGS. 4A to 4I are waveform diagrams related to the vertical sync signal at various points in FIG. 2.

DETAILED DESCRIPTION OF THE PREFERRED EMBODIMENT

Figure 2:
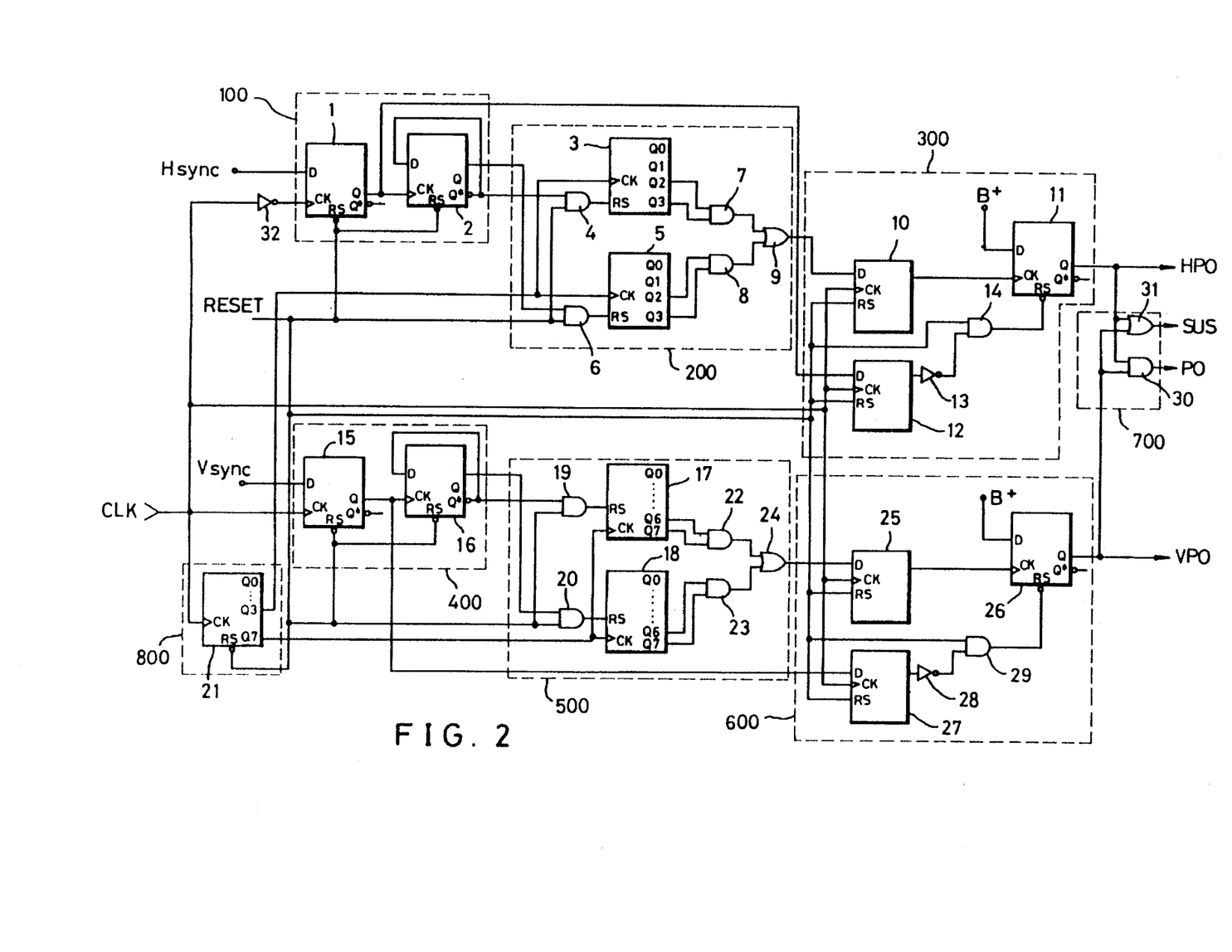
FIG. 2 is a schematic circuit diagram of the control device for power saving according to one embodiment of the present invention.

FIG. 2 shows a circuit of the control device for power saving according to one embodiment of the present invention. The control device includes a horizontal sync signal input section 100 for synchronizing an input horizontal sync signal Hsync with a system clock signal CLK and outputting the synchronized horizontal sync signal, a horizontal sync signal detecting section 200 for detecting whether or not the horizontal sync signal Hsync is inputted by counting the output of the horizontal sync signal input section 100, and a horizontal detected signal output section 300 for outputting a horizontal power-off signal HPO in accordance with the horizontal sync signal Hsync outputted from the horizontal sync signal detecting section 200.

The control device also includes a vertical sync signal input section 400 for synchronizing an input vertical sync signal Vsync with the system clock signal CLK and outputting the synchronized vertical sync signal, a vertical sync signal detecting section 500 for detecting whether or not the vertical sync signal Vsync is inputted by counting the output of the vertical sync signal input section 400, and a vertical detected signal output section 600 for outputting a vertical power-off signal VPO in accordance with the vertical sync signal Vsync outputted from the vertical sync signal detecting section 500.

The control device also includes a control signal output section 700 for outputting a system power-off signal PO or a suspension signal SUS in accordance with the horizontal power-off signal HPO and the vertical power-off signal VPO, and a clock generating section 800 for generating and providing the system clock signal to the horizontal sync signal detecting section 200 and the vertical sync signal detecting section 500.

The horizontal sync signal input section 100 comprises a flip-flop 1 for synchronizing the horizontal sync signal Hsync with the system clock signal CLK, and a flip-flop 2 being toggled by the horizontal sync signal Hsync synchronized by the flip-flop 1.

The horizontal sync signal detecting section 200 comprises counters 3 and 5 for counting the system clock signal CLK in a period when they are not reset, the counters being reset by the output of the horizontal sync signal input section 100, AND gates 4 and 6 for resetting the counters 3 and 5 in accordance with a system reset signal RESET and the non-inverting output of the flip-flop 2 inputted thereto, AND gates 7 and 8 and an OR gate 9 for detecting the input horizontal sync signal Hsync by combining the outputs of the counters 3 and 5.

The horizontal detected signal output section 300 comprises a monostable multivibrator 10 providing a pulse signal in accordance with the output of the OR gate 9 in the horizontal sync signal detecting section 200, a flip-flop 11 receiving the pulse signal from the monostable multivibrator 10 as its clock signal and outputting the horizontal power-off signal HPO in accordance with the horizontal sync signal Hsync, a monostable multivibrator 12 providing a pulse signal in accordance with the horizontal sync signal Hsync outputted from the non-inverting terminal of the flip-flop 1 in the horizontal sync signal input section 100, an inverter 13 and an AND gate 14 for resetting the flip-flop 11 in accordance with the output of the monostable multivibrator 12.

The vertical sync signal input section 400 comprises a flip-flop 15 for synchronizing the vertical sync signal Vsync with the system clock signal CLK, and a flip-flop 16 being toggled by the vertical sync signal Vsync synchronized by the flip-flop 15.

The vertical sync signal detecting section 500 comprises counters 17 and 18 for counting the system clock signal in a period when they are not reset, the counters 17 and 18 being reset by the output of the vertical sync signal input section 400, AND gates 19 and 20 for resetting the counters 17 and 18 in accordance with the system reset signal RESET and the inverting output of the flip-flop 16 inputted thereto, AND gates 22 and 23 and an OR gate 24 for detecting the input vertical sync signal Vsync by combining the outputs of the counters 17 and 18.

The vertical detected signal output section 600 comprises a monostable multivibrator 25 providing a pulse signal in accordance with the output of the OR gate 24 in the vertical sync signal detecting section 500, a flip-flop 26 receiving the pulse signal from the monostable multivibrator 25 as its clock signal and outputting the vertical power-off signal VPO in accordance with the vertical sync signal Vsync, a monostable multivibrator 27 providing a pulse signal in accordance with the vertical sync signal Vsync outputted from the non-inverting terminal of the flip-flop 15 in the vertical sync signal input section 400, an inverter 28 and an AND gate 29 for resetting the flip-flop 26 in accordance with the output of the monostable multivibrator 27.

The control signal output section 700 comprises an AND gate 30 for AND-gating the horizontal power-off signal HPO from the horizontal detected signal output section 300 and the vertical power-off signal VPO from the vertical detected signal output section 600 and outputting the system power-off signal PO, and an OR gate 31 for OR-gating the horizontal power-off signal HPO and the vertical power-off signal VPO and outputting the suspension signal SUS.

The clock generating section 800 comprises a decimal counter 21, which performs decimal counting with respect to the system clock signal CLK, and provides its output Q3 to the counters 3 and 5 and its output Q9 to the counters 17 and 18.

The operation of the control device for power saving according to the present invention as constructed above will be explained with reference to FIGS. 2, 3A to 3I, 4A to 4I, and 5.

In case that both the horizontal sync signal Hsync and the vertical sync signal Vsync are inputted, the control device is initialized, and then the counter 21 in the clock generation section 800 performs decimal counting with respect to the system clock signal. The output Q3 of the counter 21 is provided to the counters 3 and 5 as their clock signal, and the output Q9 of the counter 21 is provided to the counters 17 and 18 as their clock signal. Thus, the counters can operate with a timing synchronized with the clock signal.

Figure 3A:
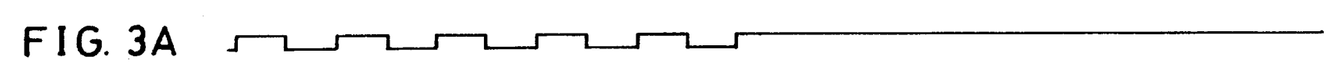
Figure 3B:
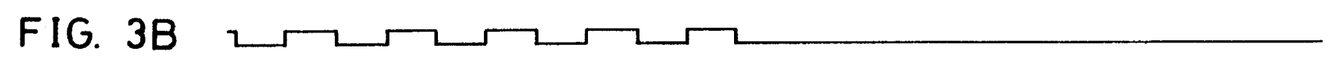
Figure 3C:
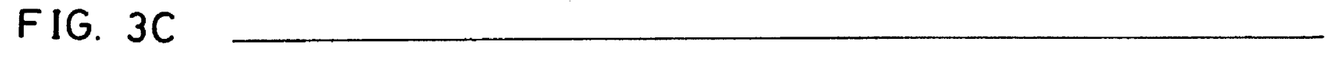
Figure 3D:
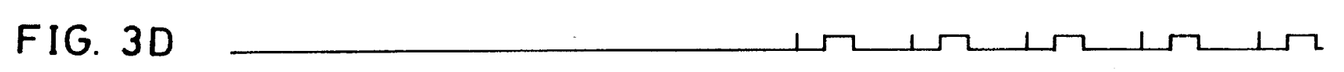
Figure 3E:
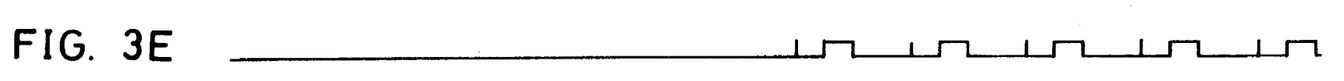
Figure 3F:
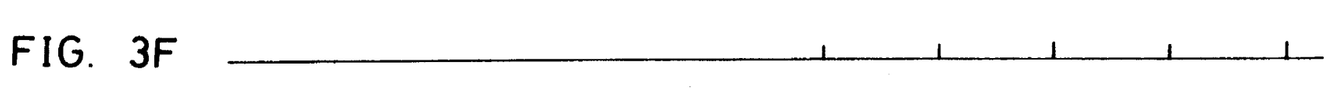
Figure 3G:
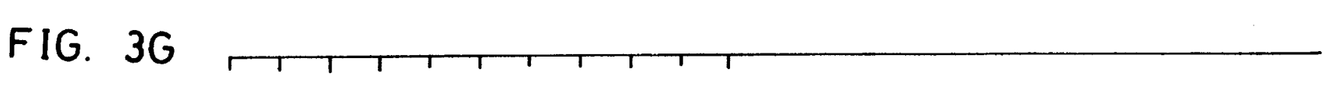
Figure 3H:
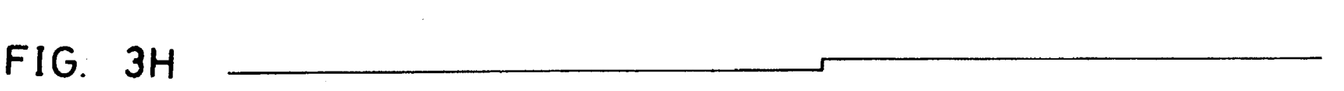
Figure 3I:
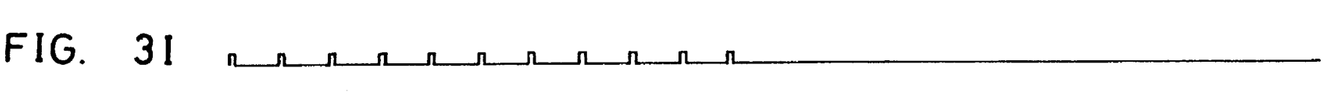

If the horizontal sync signal Hsync as shown in FIG. 3I is inputted to the input terminal D of the flip-flop 1, the horizontal sync signal Hsync is synchronized with the system clock signal CLK inverted by the inverter 32, and the synchronized horizontal sync signal is provided from the output terminal Q of the flip-flop 1 to the following flip-flop 2 as its clock signal and to the monostable multivibrator 12 as its input data.

The flip-flop 2 is toggled by the horizontal sync signal Hsync, and outputs a signal as shown in FIG. 3A and an inverted signal as shown in FIG. 3B. The signal as shown in FIG. 3A, which is outputted from the non-inverting output terminal Q of the flip-flop 2, is inputted to the reset terminal RS of the counter 5 through the AND gate 6 to reset the counter 5, and the inverted signal as shown in FIG. 3B, which is outputted from the inverting output terminal Q* of the flip-flop 2, is inputted to the reset terminal of the counter 3 through the AND gate 4 to reset the counter 3.

The counters 3 and 5 perform counting operation in a period when the reset state is released (i.e., in a high-leveled period). At this time, if the input horizontal sync signal Hsync exists, the outputs of the AND gates 7 and 8 are kept low as shown in FIGS. 3C and 3D since the reset-active time of the AND gates 7 and 8 is determined to be shorter than the outputs Q2 and Q3 of the counters 3 and 5. Accordingly, the output of the OR gate 9 becomes low as shown in FIG. 3E.

Since the output of the OR gate 9 is low, the present state does not change, and thus the output of the monostable multivibrator 10 is not generated as shown in FIG. 3F. Accordingly, the output of the flip-flop 11, which receives the output of the monostable multivibrator 10 as its clock signal, is kept low as its initial reset state, causing the horizontal power-off signal HPO to be low as shown in FIG. 3H. At this time, the monostable multivibrator 12 receives the horizontal sync signal Hsync outputted from the flip-flop 1 as its input data, and provides a pulse signal. This pulse signal is inputted to the flip-flop 11 as its reset signal through the inverter 13 and the AND gate 14 as shown in FIG. 3G. However, since the output of the flip-flop 11 has already been low, the reset signal has no meaning.

The operation of the control device with respect to the input vertical sync signal Vsync is the same as that with respect to the input horizontal sync signal Hsync as described above.

Figure 4A:
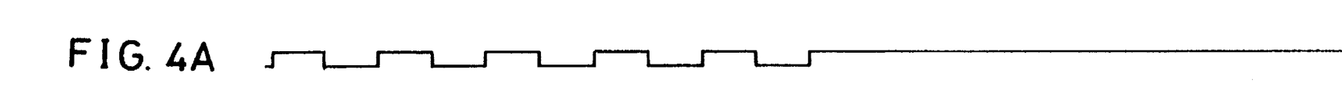
Figure 4B:
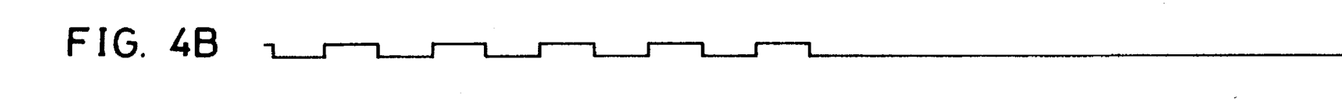
Figure 4C:
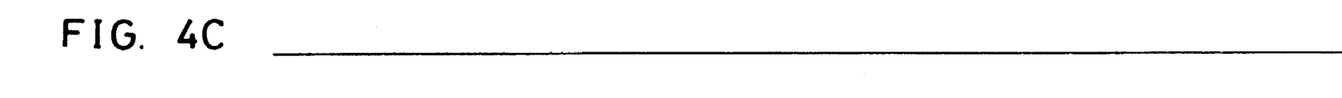
Figure 4D:
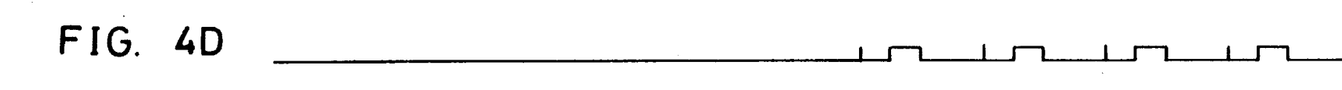
Figure 4E:
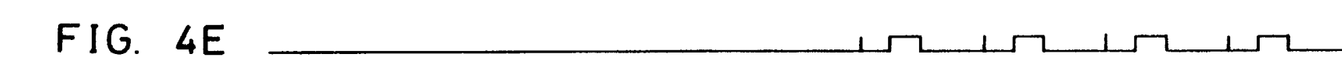
Figure 4F:
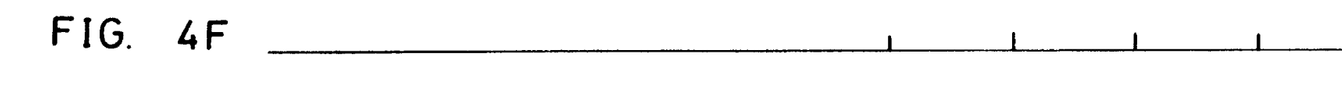
Figure 4G:
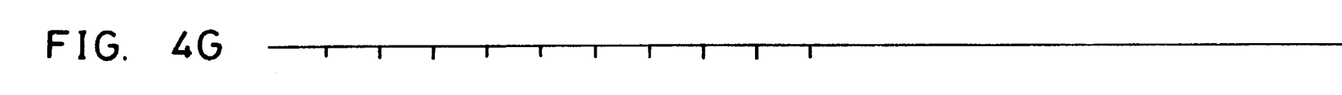
Figure 4H:
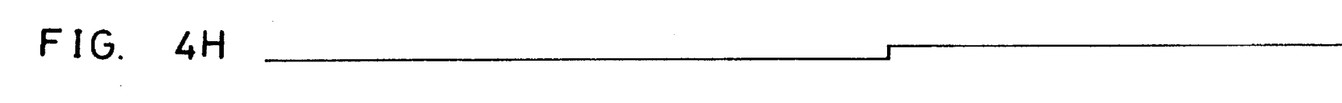
Figure 4I:
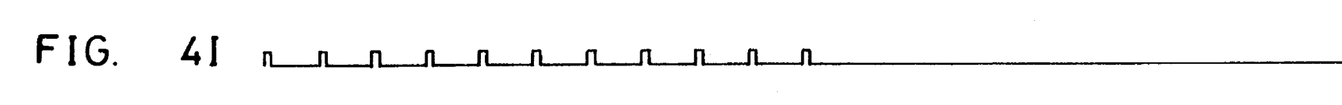

If the vertical sync signal Vsync as shown in FIG. 4I is inputted to the input terminal D of the flip-flop 15, the vertical sync signal Vsync is synchronized with the system clock signal CLK, and the synchronized vertical sync signal is inputted to the following flip-flop 16 as its clock signal and to the monostable multivibrator 27 as its input data.

The flip-flop 16 is toggled by the input vertical sync signal Vsync, and output a signal as shown in FIG. 4A and an inverted signal as shown in FIG. 4B. The signal as shown in FIG. 4A, which is outputted from the non-inverting output terminal Q of the flip-flop 16, is inputted to the reset terminal RS of the counter 17 through the AND gate 19 to reset the counter 17, while the inverted signal as shown in FIG. 4B, which is outputted from the inverting output terminal Q* of the flip-flop 16, is inputted to the reset terminal of the counter 18 through the AND gate 20 to reset the counter 18.

The counters 17 and 18 perform counting operation in a period when the reset state is released (i.e., in a high-leveled period). At this time, if the input vertical sync signal Vsync exists, the outputs of the AND gates 22 and 23 are kept low as shown in FIGS. 4C and 4D since the reset-active time of the AND gates 22 and 23 is determined to be shorter than the outputs Q6 and Q7 of the counters 17 and 18. Accordingly, the output of the OR gate 24 becomes low as shown in FIG. 4E.

Since the output of the OR gate is low, the present state does not change, and thus the output of the monostable multivibrator 25 is not generated as shown in FIG. 4F. Accordingly, the output of the flip-flop 26, which receives the output of the monostable multivibrator 25 as its clock signal, is kept low as its initial reset state, causing the vertical power-off signal VPO to be low as shown in FIG. 4H. At this time, the monostable multivibrator 27 receives the vertical sync signal vsync outputted from the flip-flop 15 as its input data, and provides a pulse signal. This pulse signal is inputted to the flip-flop 26 as its reset signal through the inverter 28 and the AND gate 29 as shown in FIG. 4G. However, the output of the flip-flop 26 has already been low, and thus the reset signal has no meaning.

Consequently, the horizontal power-off signal HPO outputted form the flip-flop 11 and the vertical power-off signal VPO outputted from the flip-flop 26 are inputted to the OR gate 31 and the AND gate 30 in the control signal output section 700, resulting in that both the suspension signal SUS and the power-off signal PO outputted from the control signal output section become low.

In case that the horizontal sync signal Hsync is not inputted, but the vertical sync signal Vsync is inputted, the counters 3 and 5 perform counting operation with the clock signal provided from the counter 21 in a period when the reset of the counters 3 and 5 is released. In response to the outputs Q2 and Q3 of the counters 3 and 5, the outputs of the AND gates 7 and 8 are shown in FIGS. 3C and 3D. Accordingly, the OR gate 9 outputs a signal as shown in FIG. 3E to the monostable multivibrator 10 as its data.

The monostable multivibrator 10 outputs a pulse signal as shown in FIG. 3F in accordance with the system clock signal CLK. Since the output of the flip-flop 11, which receives the pulse signal from the monostable multivibrator 10 as its clock signal, becomes high as shown in FIG. 3H in a period when the horizontal sync signal Hsync does not exist, the horizontal power-off signal HPO becomes high and thus the suspension signal SUS outputted from the OR gate 31 becomes high.

Thereafter, if the horizontal sync signal Hsync is inputted, the monostable multivibrator 12 generates a pulse signal in accordance with the horizontal sync signal outputted from the flip-flop 1. This pulse signal is provided to the flip-flop 11 through the inverter 13 and the AND gate 14 to reset the flip-flop 11, resulting in that the horizontal power-off signal HPO and the suspension signal SUS may be low again.

In case that the horizontal sync signal Hsync is inputted but the vertical sync signal Vsync is not inputted, the counters 17 and 18 perform counting operation with the clock signal from the output terminal Q9 of the counter 21 in a period when the reset of the counters 17 and 18 is released, and the outputs of the AND gates 22 and 23 are shown in FIGS. 4C and 4D in accordance with the outputs Q2 and Q3 of the counters 17 and 18. Accordingly, the OR gate 24 outputs the signal as shown in FIG. 4E to the monostable multivibrator 25 as its input data, and the monostable multivibrator 25 outputs the pulse signal as shown in FIG. 4F in accordance with the system clock signal CLK.

The output of the flip-flop 26, which receives the clock signal from the monostable multivibrator 25 as its clock signal, becomes high as shown in FIG. 4H in a period when the vertical sync signal Vsync does not exist, and thus the vertical power-off signal VPO becomes high, causing the suspension signal SUS outputted from the OR gate 31 also to become high.

Thereafter, if the vertical sync signal Vsync is inputted, the monostable multivibrator 27 outputs a pulse signal in accordance with the vertical sync signal Vsync outputted from the flip-flop 15. This pulse signal is provided to the flip-flop 26 through the inverter 28 and the AND gate 29 to reset the flip-flop 26, resulting in that both the vertical power-off signal VPO and the suspension signal SUS may be low again.

In summary, if either the horizontal sync signal Hsync or the vertical sync signal Vsync is inputted, either of the two power-off signals HPO and VPO becomes high, resulting in that the suspension signal SUS outputted from the OR gate 31 becomes high, and the system power-off signal PO outputted from the AND gate 30 becomes low. In the meantime, neither the horizontal sync signal Hsync nor the vertical sync signal Vsync is inputted, both the horizontal power-off signal HPO and the vertical power-off signal VPO become high, resulting in that both the suspension signal SUS and the system power-off signal PO become high. The suspension signal SUS and the system power-off signal PO as described above is provided to the following control system such as a CPU, so that the control system controls the appliance to go into the suspension mode or the system power-off mode.

Figure 5:
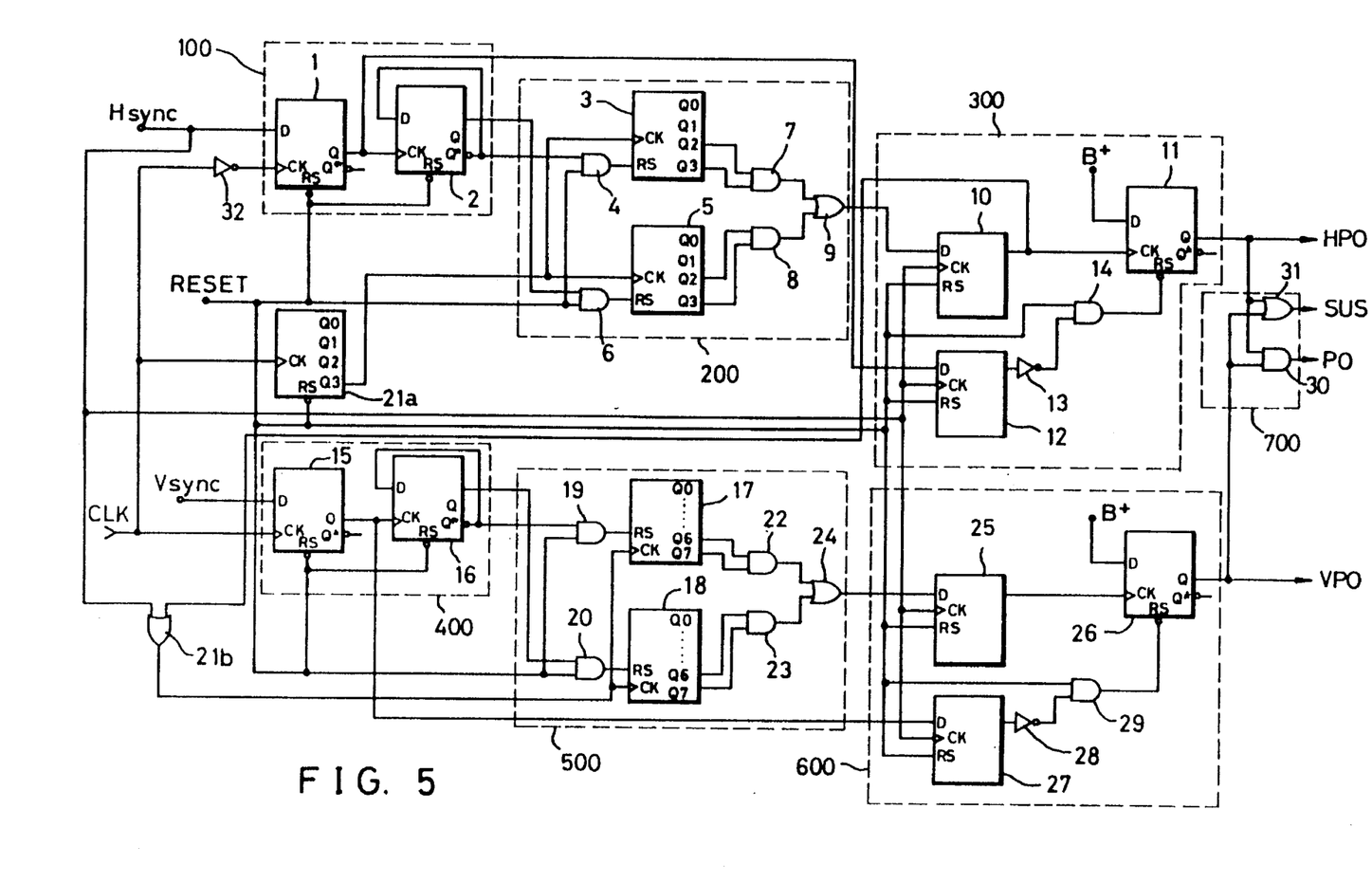
FIG. 5 is a schematic circuit diagram of the control device for power saving according to another embodiment of the present invention.

FIG. 5 shows a circuit of the control device for power saving according to another embodiment of the present invention. According to the circuit of FIG. 5, the counter 21 in FIG. 2 is replaced by a 4:1 (divide-by-4) counter 21a, and the output Q3 of this counter 21a is provided to the counters 3 and 4 as their clock signal. Also, an OR gate 21b is added to OR-gate the input horizontal sync signal Hsync and the output of the monostable multivibrator 10. The output of the OR gate 21b is provided to the counters 17 and 18 as their clock signal. Referring to FIG. 5, the counter 21a counts the system clock signal CLK and provides its output signal to the counters 3 and 5 as their clock signal as in FIG. 2. The OR gate 21b provides the horizontal sync signal Hsync to the counters 17 and 18 as their clock signal if the horizontal sync signal Hsync is inputted. If the horizontal sync signal Hsync is not inputted, the OR gate 21b provides the output pulse signal of the monostable multivibrator 10 to the counters 17 and 18 as their clock signal, enabling the counters 17 and 18 to operate. The counters 17 and 18 can store more than the 6:1 (divide-by-6) counted value.

From the foregoing, it will be apparent that the control device for power saving according to the present invention has the advantages that its transient response characteristic is improved and its control reliability is greatly increased since it is constructed as a digital circuit, not as an analog circuit as in the convention device, and the existence of the input sync signal is determined within two-period time of the sync signal.

While the present invention has been described and illustrated herein with reference to the preferred embodiments thereof, it will be understood by those skilled in the art that various changes in form, details, and applications may be made wherein without departing from the spirit and scope of the invention.

What is claimed is:

1. A control device for power saving comprising:

horizontal sync signal input means for providing a horizontal sync signal synchronized with a system clock signal;

horizontal sync signal detecting means for detecting whether or not said horizontal sync signal is inputted by counting an output of said horizontal sync signal input means;

horizontal detected signal output means for outputting a horizontal power-off signal in accordance with an output of said horizontal sync signal detecting means;

vertical sync signal input means for providing a vertical sync signal synchronized with said system clock signal;

vertical sync signal detecting means for detecting whether or not said vertical sync signal is inputted by counting an output of said vertical sync signal input means;

vertical detected signal output means for outputting a vertical power-off signal in accordance with an output of said vertical sync signal detecting means;

control signal output means for outputting a system power-off signal or a suspension signal for a suspension mode in accordance with said horizontal power-off signal from said horizontal detected signal output means and said vertical power-off signal from said vertical detected signal output means; and clock generating means for providing said system clock signal to said horizontal sync signal detecting means and said vertical sync signal detecting means.

2. A control device for power saving as claimed in claim 1, wherein said horizontal sync signal input means comprises:

a first flip-flop for synchronizing said horizontal sync signal with said system clock signal; and a second flip-flop being toggled by said horizontal sync signal synchronized by said first flip-flop and providing its inverting output and non-inverting output to said horizontal sync signal detecting means.

3. A control device for power saving as claimed in claim 1, wherein said horizontal sync signal detecting means comprises:

two counters for counting said system clock signal in a period when they are not reset, said counters being reset by an output of said horizontal sync signal input means;

two AND gates for resetting said counters in accordance with a system reset signal and output of said horizontal sync signal input means;

two other AND gates and an OR gate for detecting said input horizontal sync signal by combining outputs of said counters.

4. A control device for power saving as claimed in claim 1, wherein said horizontal detected signal output means comprises:

a first monostable multivibrator providing a pulse signal in response to the output of said horizontal sync signal detecting means;

a flip-flop receiving said pulse signal from said first monostable multivibrator as its clock signal, and outputting said horizontal power-off signal to said control signal in response to said horizontal sync signal outputted from said first flip-flop in said horizontal sync signal input means;

an inverter and an AND gate for resetting said flip-flop in accordance with the output of said second monostable multivibrator.

5. A control device for power saving as claimed in claim 1, wherein said vertical sync signal input means comprises:

a third flip-flop for synchronizing said vertical sync signal with said system clock signal; and a fourth flip-flop being toggled by said vertical sync signal synchronized by said third flip-flop, said fourth flip-flop providing its inverting output and its non-inverting output to said vertical sync signal detecting means.

6. A control device for power saving as claimed in claim 1, wherein said vertical sync signal detecting means comprises:

two counters for counting said system clock signal in a period when they are not reset, said counters being reset by an output of said vertical sync signal input means;

two AND gates for resetting said counters in accordance with a system reset signal and output of said vertical sync signal input means;

two other AND gates and an OR gate for detecting said input vertical sync signal by combining outputs of said counters.

7. A control device for power saving as claimed in claim 1, wherein said vertical detected signal output means comprises:

a third monostable multivibrator providing a pulse signal in response to the output of said vertical sync signal detecting means;

a flip-flop receiving said pulse signal from said third monostable multivibrator as its clock signal, and outputting said vertical power-off signal to said control output means;

a fourth monostable multivibrator providing a pulse signal in response to said vertical sync signal outputted from said third flip-flop in said vertical sync signal input means;

an inverter and an AND gate for resetting said flip-flop in accordance with the output of said fourth monostable multivibrator.

8. A control device for power saving as claimed in claim 1, wherein said control signal output means comprises:

an AND gate for AND-gating said horizontal power-off signal from said horizontal detected signal output means and said vertical power-off signal from said vertical detected signal output means, and outputting said system power-off signal; and an OR gate for OR-gating said horizontal power-off signal and said vertical power-off signal, and outputting said suspension signal.

9. A control device for power saving as claimed in claim 1, wherein said clock generating means comprises a decimal counter for performing decimal counting with respect to said system clock signal, and providing its counted output to said horizontal sync signal detecting means and said vertical sync signal detecting means as their clock signal.

10. A control device for power saving as claimed in claim 1, wherein said clock generating means comprises:

a 4:1 counter for counting said system clock signal and providing its counted output to said horizontal sync signal detecting means as its clock signal; and an OR gate for OR-gating said input horizontal sync signal and the output of said first monostable multivibrator in said horizontal detected signal output means, and providing its output to said vertical sync signal detecting means as its clock signal.

* * * * *

UNITED STATES PATENT AND TRADEMARK OFFICE
CERTIFICATE OF CORRECTION

PATENT NO.   : 5,550,885

DATED        : August 27, 1996

INVENTOR(S)  : Keyoung Tae Nam et al.

It is certified that error appears in the above-identified patent and that said Letters Patent is hereby corrected as shown below:

Col. 6, line 31, please delete "vsync" and replace with --Vsync--.

Signed and Sealed this

Third Day of February, 1998

BRUCE LEHMAN

Attest:

Attesting Officer

Commissioner of Patents and Trademarks